(12) United States Patent
Joachimsthaler et al.

(10) Patent No.: US 10,378,991 B2
(45) Date of Patent: Aug. 13, 2019

(54) ANGLE-MEASURING DEVICE AND METHOD FOR OPERATING AN ANGLE-MEASURING DEVICE

(71) Applicant: DR. JOHANNES HEIDENHAIN GmbH, Traunreut (DE)

(72) Inventors: Ingo Joachimsthaler, Traunstein (DE); Thomas Geisler, Surberg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 228 days.

(21) Appl. No.: 15/351,464

(22) Filed: Nov. 15, 2016

(65) Prior Publication Data
US 2017/0146422 A1 May 25, 2017

(30) Foreign Application Priority Data
Nov. 23, 2015 (DE) .................. 10 2015 223 061

(51) Int. Cl.
*G01M 1/22* (2006.01)
*G01M 1/30* (2006.01)
*G01M 1/36* (2006.01)
*G01D 5/12* (2006.01)
*G01D 5/244* (2006.01)
*G01D 5/347* (2006.01)

(52) U.S. Cl.
CPC .............. *G01M 1/22* (2013.01); *G01D 5/12* (2013.01); *G01D 5/24452* (2013.01); *G01D 5/3473* (2013.01); *G01M 1/30* (2013.01); *G01M 1/36* (2013.01)

(58) Field of Classification Search
CPC ....................................................... G01M 1/22
USPC ................................... 73/462, 460, 471, 472
See application file for complete search history.

(56) References Cited

U.S. PATENT DOCUMENTS

| | | | | |
|---|---|---|---|---|
| 4,201,091 A | * | 5/1980 | Guyot | ................... G01M 1/225 73/462 |
| 4,423,632 A | * | 1/1984 | Madden | .................. G01M 1/06 73/462 |
| 5,659,136 A | | 8/1997 | Koch et al. | |
| 5,705,748 A | | 1/1998 | Moench | |

(Continued)

FOREIGN PATENT DOCUMENTS

| | | |
|---|---|---|
| DE | 4104694 A1 | 8/1992 |
| DE | 3153754 C2 | 9/1994 |

(Continued)

*Primary Examiner* — Robert R Raevis
(74) *Attorney, Agent, or Firm* — Leydig, Voit & Mayer, Ltd.

(57) ABSTRACT

An angle-measuring device includes a housing and a position sensor configured to generate angle values indicating an angular position of a shaft with respect to a reference position. An interface is configured to communicate with subsequent electronics via a data channel. At least one imbalance sensor is configured to generate an imbalance signal from imbalance-induced excursions of the shaft. An imbalance analyzer is configured to generate imbalance values from the imbalance signal. A signal processor is configured to generate imbalance information from the angle values and the imbalance values. The imbalance information is transmittable through the interface to the subsequent electronics.

19 Claims, 6 Drawing Sheets

(56) References Cited

U.S. PATENT DOCUMENTS

| | | | | |
|---|---|---|---|---|
| 6,094,804 A | * | 8/2000 | Chuang | G11B 17/038 29/407.01 |
| 6,244,108 B1 | * | 6/2001 | McInnes | G01M 1/02 73/462 |
| 2013/0312515 A1 | | 11/2013 | Rodriguez | |
| 2015/0331009 A1 | | 11/2015 | Galdos et al. | |

FOREIGN PATENT DOCUMENTS

| | | |
|---|---|---|
| DE | 19539633 A1 | 4/1997 |
| DE | 19813881 A1 | 10/1999 |
| DE | 102013209004 A1 | 11/2013 |
| EP | 2719499 A1 | 4/2014 |
| EP | 2944966 A1 | 11/2015 |
| WO | WO 2009156094 A1 | 12/2009 |

\* cited by examiner

ANGLE-MEASURING DEVICE AND METHOD FOR OPERATING AN ANGLE-MEASURING DEVICE

CROSS-REFERENCE TO PRIOR APPLICATION

Priority is claimed to German Patent Application No. DE 10 2015 223 061.9, filed on Nov. 23, 2015, the entire disclosure of which is hereby incorporated by reference herein.

FIELD

The present invention relates to an angle-measuring device and a method for operating an angle-measuring device. In particular, the angle-measuring device is suitably adapted to generate information relating to an imbalance of the shaft measured by the angle-measuring device.

BACKGROUND

Angle-measuring devices for sensing the angular position of a shaft are widespread in automation technology and in machine tools. They are used, for example, to determine, in closed-loop drive mechanisms, actual position values which are needed by subsequent electronics, such as a numerical control system, to calculate setpoints for control circuits used to control the drive mechanism (e.g., the feed rate of a tool or workpiece). To this end, a mechanically rigid connection is made between the encoder shaft and the machine shaft, so that movement of the machine shaft is transmitted directly to the encoder shaft. For the purpose of determining the rotation angle of the shaft to be measured, angle-measuring devices include a material measure, which is usually in the form of a code disk having a graduation structure applied thereto. By scanning the graduation structure, it is possible to determine the angular position of the shaft. This is done using, for example, optical, magnetic or inductive scanning principles. The angle measurement may be based on incremental and/or absolute measurement principles.

Today, it is preferred to use angle-measuring devices which, regardless of whether the underlying measurement principle is absolute or incremental, or both absolute and incremental, generate absolute angle values which are transmitted from the position-measuring device to subsequent electronics via digital, usually serial, data interfaces.

Especially in cases where an angle-measuring device is intended to measure the angular position of a shaft of a drive mechanism that moves heavy loads, such as, for example, the drive of a rotary table axis in a machine tool, or when high rotational speeds are required, such as in the case of a machine tool spindle, it is important that the mass moved by the drive not have an imbalance with respect to the axis of rotation of the shaft.

WO 2009/156094 describes an electromechanical balancing system. For purposes of determining the imbalance, separate sensors are needed to detect the rotational speed and the vibrations caused by the imbalance. The analysis of the sensor signals is performed in a distributed manner.

SUMMARY

In an embodiment, the present invention provides an angle-measuring device including a housing and a position sensor configured to generate angle values indicating an angular position of a shaft with respect to a reference position. An interface is configured to communicate with subsequent electronics via a data channel. At least one imbalance sensor is configured to generate an imbalance signal from imbalance-induced excursions of the shaft. An imbalance analyzer is configured to generate imbalance values from the imbalance signal. A signal processor is configured to generate imbalance information from the angle values and the imbalance values. The imbalance information is transmittable through the interface to the subsequent electronics.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a device which generates, in a simple manner, information about the imbalance of a shaft or of a machine part driven by a shaft.

According to an embodiment, an angle-measuring device includes:
  a housing,
  a position-sensing unit for generating angle values indicating the angular position of a shaft with respect to a reference position,
  an interface unit for communicating with subsequent electronics via a data channel, the angle-measuring device further including:
  at least one imbalance sensor which generates an imbalance signal from imbalance-induced excursions of the shaft,
  an imbalance analysis unit which generates imbalance values from the imbalance signal, as well as
  a signal-processing unit which generates imbalance information from the angle values and the imbalance values, the imbalance information being transmittable through the interface unit to subsequent electronics.

In another embodiment, the present invention provides a method which makes it possible to generate, in a simple manner, information about the imbalance of a shaft or of a machine part driven by a shaft.

According to an embodiment, a method for operating an angle-measuring device according to the present invention is provided, wherein:

the position-sensing unit generates angle values indicating the angular position of the shaft with respect to a reference position, the imbalance detection unit generates imbalance values from the imbalance signal produced by the at least one imbalance sensor, the imbalance values being a measure of the imbalance-induced excursion of the shaft, and the angle values and the imbalance values are fed to the signal-processing unit which, based on the angle values and the imbalance values, generates the imbalance information, which includes at least the phase relation of the imbalance signal with respect to the reference position as well as the amplitude of the imbalance signal.

Accordingly, an angle-measuring device, which is generally provided anyway for measuring the angular position of a shaft, is enhanced such that it is capable of generating imbalance information. Thus, the angle-measuring device forms a self-contained system for determining imbalance.

Further advantages and features of the present invention will be apparent from the following description which makes reference to the drawings.

Figure 1A:
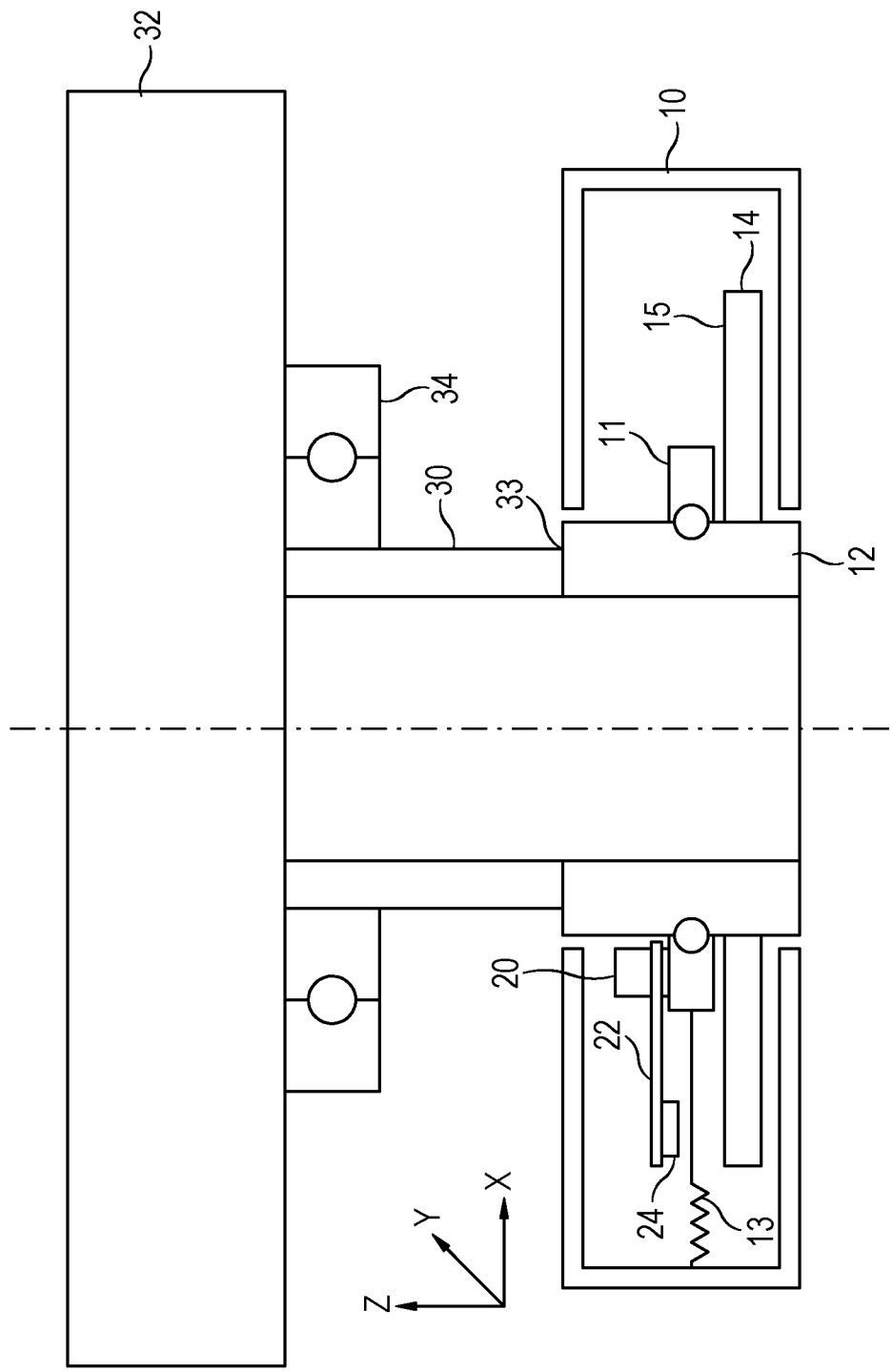
FIG. 1a is a view illustrating a mechanical configuration of an angle-measuring device according to an embodiment of the present invention.

FIG. 1a shows the mechanical configuration of an inventive angle-measuring device which is mounted to a shaft 30 of a machine. In this exemplary embodiment, the machine is a rotary table 32 of a machine tool. Generally, however, angle-measuring devices according to the present invention can always be used when the imbalance of a machine shaft, or of a machine part driven by the shaft, is to be detected and quantified.

Other examples of possible uses of angle-measuring devices according to the present invention include grinding machines, lathes, and machine tool spindles.

Shaft 30 of rotary table 32 is supported by a load-supporting bearing 34 such that it can rotate relative to a machine bed. Any asymmetrical loading of rotary table 32 results in an imbalance causing small excursions of the portion of load-supporting bearing 34 that rotates with shaft 30 (and thus also of shaft 30 itself) relative to the stationary portion of load-supporting bearing 34, which is connected to the machine bed.

The angle-measuring device has a housing 10 secured to the machine bed. A shaft 12 of the angle-measuring device is rotatably supported in housing 10 by a bearing 11 and mechanically rigidly connected to shaft 30 rotary table 32. Suitable connection means 33 are provided for this purpose. The connection may be created using, for example, threaded connections. Likewise, a coupling element may be provided that ensures a sufficiently rigid connection to transmit excursions of shaft 30 to shaft 12. Thus, shaft 12 forms, as it were, an extension of shaft 30.

The portion of bearing 11 that is stationary with respect to shaft 12 is mechanically, axially and radially flexibly connected to housing 10 via a coupling 13 (shown only symbolically). Coupling 13 may include spring and/or damping elements for this purpose. The mechanically flexible connection allows for imbalance-induced excursion of bearing 11 relative to housing 10. However, coupling 13 is rigid in the torsional direction, which allows for accurate angle measurement.

A material measure 14 having a measuring graduation 15 arranged radially around the common axis of rotation of shafts 12, 30 is non-rotatably connected to shaft 12, so that rotation of rotary table 32 or its shaft 30 causes rotation of material measure 14.

In an alternative embodiment, material measure 14 could also be non-rotatably connected directly to shaft 30 of the machine. In this case, shaft 12, bearing 11, and connection means 33 of the angle-measuring device could be dispensed with.

Measuring graduation 15 includes one or more graduation tracks which may have an incremental code or/and an absolute code, depending on the operating principle of the angle-measuring device.

Incremental graduation tracks are formed by a regular sequence of code elements, the scanning of which results in periodic, usually substantially sinusoidal position signals. Position determination is performed by counting signal periods and fractions of signal periods (interpolation) and is therefore strictly relative. To be able to establish an absolute reference, a reference mark is usually provided. The reference mark may be disposed on a separate graduation track or integrated in the incremental graduation track. By passing over the reference mark, it is possible to associate an actual angle value.

Absolutely coded graduation tracks may be parallel-coded (e.g., Gray code) or serial-coded (e.g., chain code, pseudo-random code). By scanning such graduation tracks, position signals are obtained which already contain an absolute angular position.

Since incremental graduation tracks permit higher angular resolution than absolute ones, angle-measuring devices often include both incrementally and absolutely coded graduation tracks. Here, the absolute position is obtained by scanning the absolutely coded graduation track (coarse position), and the resolution of the angle value is increased by scanning the incremental graduation track (fine position). In such systems, the reference mark may be dispensed with.

The physical scanning principle underlying the angle-measuring unit is irrelevant to the present invention. For example, it is possible to use an optical, magnetic, capacitive or inductive scanning principle.

In accordance with the present invention, housing 10 of the angle-measuring device has disposed therein at least one imbalance sensor 20 capable of measuring imbalance-induced excursions of shaft 12 of the angle-measuring device, and thus of shaft 30 of rotary table 32. The imbalance sensor may take the form of an acceleration sensor that senses excursions of shaft 12 in a measurement direction X.

Especially in cases where the rotary table is used to move large masses, the position of imbalance sensor 20 is not critical because when shaft 30 rotates, all components of the system are excited to vibrate due to the imbalance.

However, it is particularly advantageous if imbalance sensor 20 is mechanically rigidly connected to the stationary portion of bearing 11, because this is where the greatest excursion is expected. In the example shown, imbalance sensor 20 is disposed on a circuit board 22 which, in turn, is attached to the stationary portion of bearing 11. Thus, imbalance sensor 20 is mechanically rigidly coupled to shaft 12 radially via circuit board 22 and bearing 11. Consequently, excursions of shaft 12 directly cause excursions of imbalance sensor 20.

It is particularly advantageous to provide two imbalance sensors 20 whose measurement directions X, Y extend in orthogonal relationship to one another in the plane of rotation of material measure 14. In this case, two 90° phase-shifted, substantially sinusoidal imbalance signals are obtained which, in a known manner, may be considered as the real and imaginary parts of a complex function and may be analyzed with respect to magnitude and phase angle in a particularly simple manner using interpolator circuits which are used for analyzing position signals of incremental position-measuring devices.

If imbalance-induced wobble of shaft 12 is also to be detected, an additional imbalance sensor 20 may be provided to measure excursions in a measurement direction Z perpendicular to the plane or rotation, and thus parallel to the axis of rotation of shaft 12.

Imbalance sensors 20 may be separate components mounted on circuit board 22. However, it is particularly advantageous if at least two imbalance sensors 20 for sensing imbalance in the required measurement directions X, Y, Z are contained in one component.

From a manufacturing point of view, a particularly simple design is obtained when imbalance sensors 20 are implemented in SMD technology.

Components of the electrical circuit of the angle-measuring device, such as components for (digital or/and analog) signal processing as well as for signal/data transmission to subsequent electronics, may be entirely or partially disposed on circuit board 22. In addition, a scanning unit 24 for generating position signals by scanning measuring graduation 15 may be entirely or partially disposed on circuit board 22.

Alternatively, circuit board 22 could also be secured to housing 10, and only the at least one imbalance sensor 20 could be connected to the stationary portion of bearing 11. In this case, a cable would have to be provided for connecting imbalance sensor 20 to circuit board 22. From a manufacturing point of view, the embodiment shown is particularly advantageous because it minimizes the amount wiring required within housing 10.

Figure 1B:
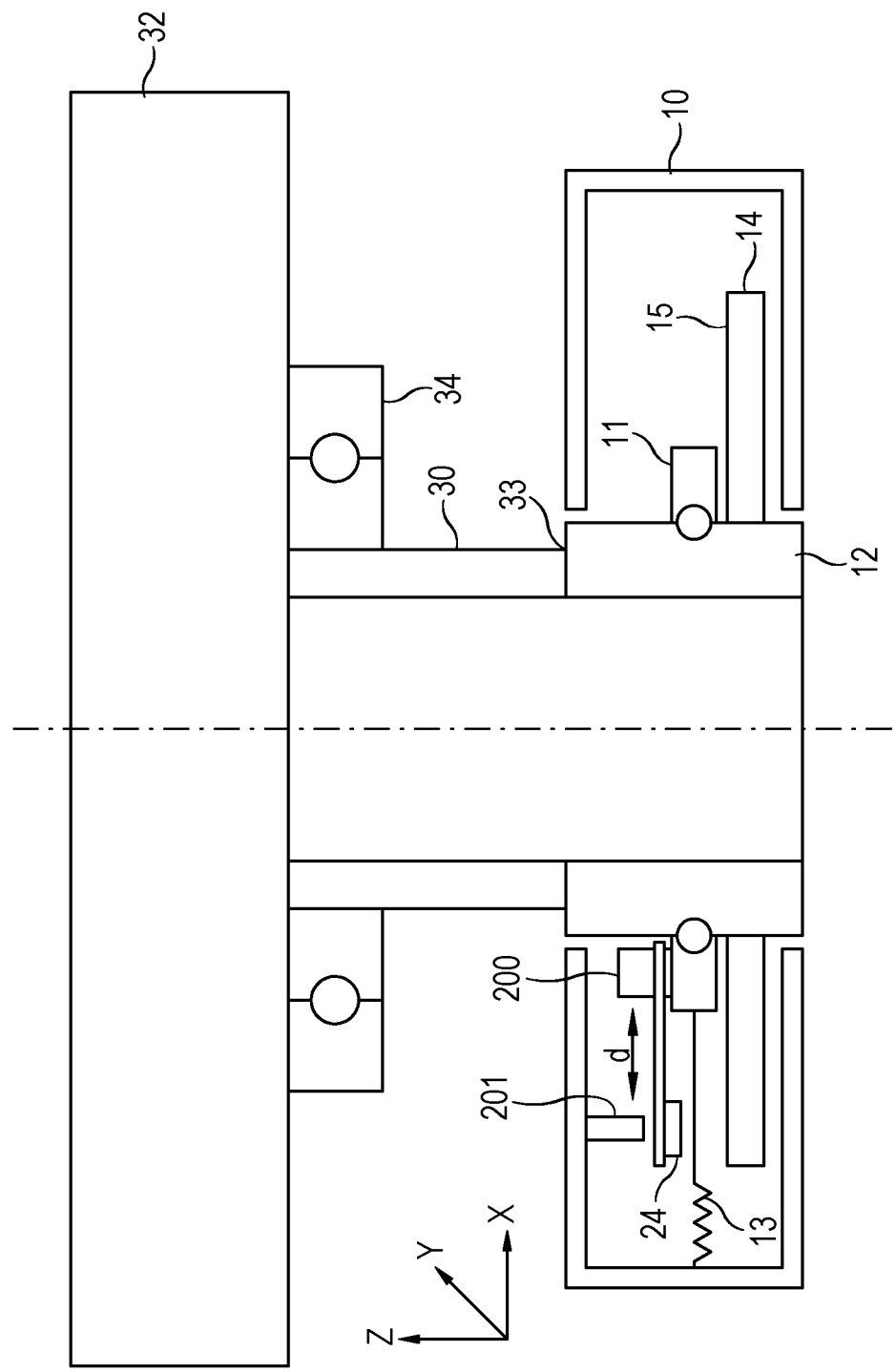
FIG. 1b is a view illustrating the mechanical configuration of an alternative embodiment of an angle-measuring device according to the present invention.

FIG. 1*b* shows the mechanical configuration of an alternative embodiment of an angle-measuring device according to the present invention. Component already described in connection with FIG. 1*a* have been given the same reference numerals.

In this example, imbalance sensor 200 is a displacement sensor 200 capable of measuring a distance d between a reference position associated with housing 10 of the angle-measuring device and a reference position associated with shaft 12. In the example shown, displacement sensor 200 is disposed on circuit board 22 and measures the distance d to a reference surface 201 on housing 10. Alternatively, the displacement sensor could also be connected to housing 10 and measure a distance d to shaft 12 directly or to material measure 14. In this case, the reference surface may be provided by suitable surfaces.

The distance measurement in displacement sensor 200 may be based on any of a variety of measurement principles, such as optical, magnetic, capacitive or inductive measurement principles.

Since coupling 13 allows for excursion of shaft 12 relative to housing 10, the variation of distance d is a measure of the imbalance. Similarly to the imbalance signals of an acceleration sensor, distance d also varies substantially sinusoidally with a period corresponding to one revolution of shaft 12.

In this exemplary embodiment, it is also particularly advantageous to provide two displacement sensors 200 for measurement directions X, Y, or even three displacement sensors 200 for measurement directions X, Y, Z.

Figure 2:
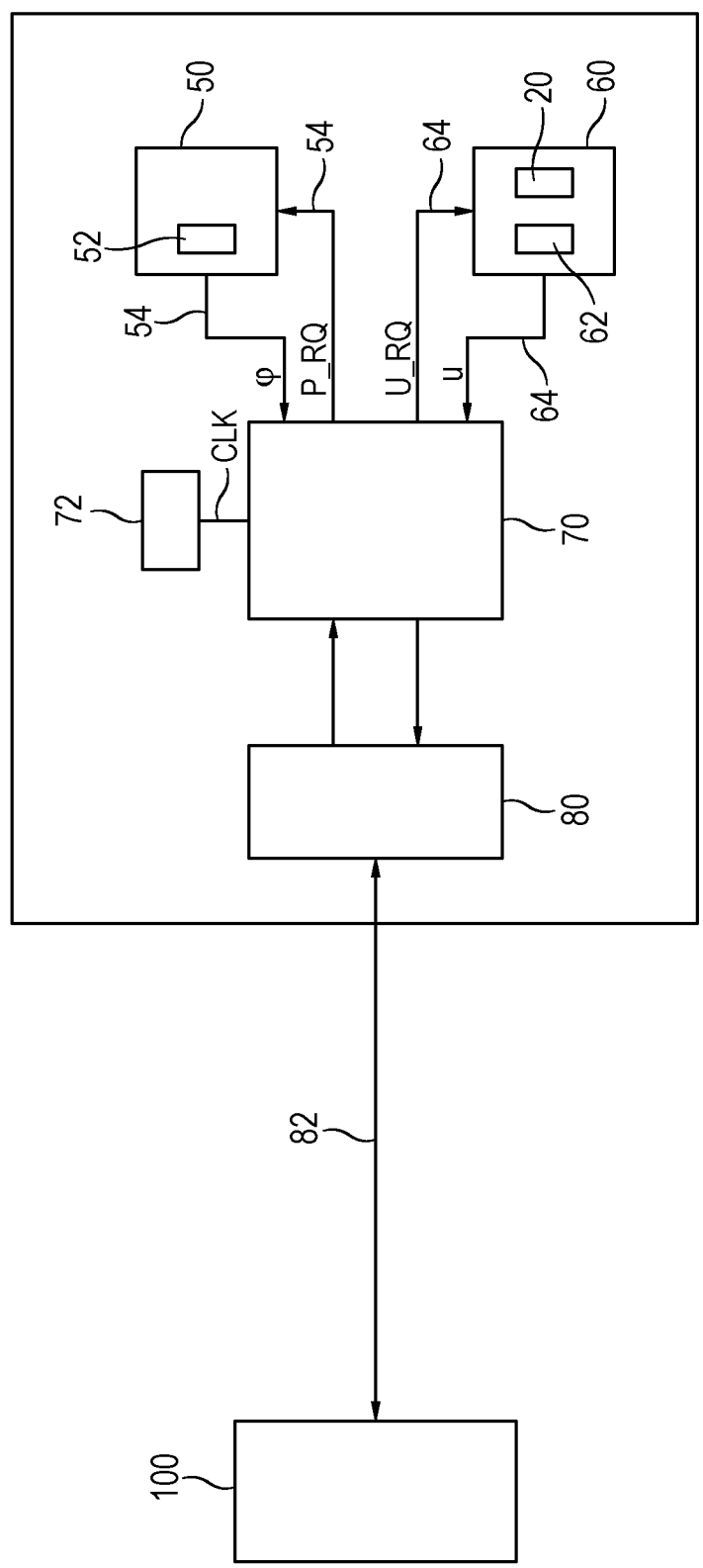
FIG. 2 is a block diagram of an angle-measuring device according to an embodiment of the present invention.

FIG. 2 shows a block diagram of an angle-measuring device according to an embodiment of the present invention. Essential functional units of the angle-measuring device are a position-sensing unit 50, an imbalance detection unit 60, a signal-processing unit 70, as well as an interface unit 80.

Position-sensing unit 50 is suitably adapted to generate digital angle values φ indicative of the angular position of shaft 12, and thus also of shaft 30, with respect to a reference position. Material measure 14 with measuring graduation 15 and scanning unit 24 for scanning the same are associated with position-sensing unit 50 for this purpose. Position-sensing unit 50 further includes a position analysis unit 52 for generating digital angle value φ from the scanning signals of scanning unit 24.

Depending on the processing steps required to process the scanning signals of scanning unit 24 into angle values φ, position-sensing unit 50 includes various functional units performing processing steps such as amplification, signal correction (offset correction, amplitude correction, phase correction), interpolation, counting grating periods, and A/D conversion, etc.

In the context of this invention, angle values φ may include a purely absolute value that indicates the angular position with a maximum resolution of the angle-measuring device. Additionally, count signals resulting from the scanning of an incremental graduation may be transmitted in parallel with the absolute value as part of angle value φ. Typically, the count signals are two 90° phase-shifted square wave signals. As a further alternative, it is possible to transmit, as the angle value φ, an absolute angle measurement value resulting from the scanning of an absolutely coded graduation track (coarse position), as well as count signals which result from the scanning of an incremental graduation and may be used to produce a fine position, for example using a counter.

The generation of angle values φ in position-sensing unit 50 may be performed continuously or only upon request from signal-processing unit 70. Mixed forms are also possible, where, for example, absolute values are generated only upon request, but count signals are transmitted continuously. Signals lines 54 are provided for transmission of corresponding control signals, in particular a position request command P_RQ, to position-sensing unit 50 and angle values φ to signal-processing unit 70.

Imbalance detection unit 60 is used to generate discrete imbalance values u corresponding to instantaneous values of the imbalance signal that is produced by the at least one imbalance sensor 20 and is a measure of the imbalance-induced excursion of shafts 12, 30. Imbalance detection unit 60 includes the at least one imbalance sensor 20 as well as an imbalance analysis unit 62.

During rotation of shaft 12 of the angle-measuring device (and thus of shaft 30 of rotary table 32), imbalance sensor 20 produces an imbalance signal which is dependent on the imbalance of shafts 12, 30, in particular of the mass moved by shaft 30. When shaft 12 rotates at a constant speed, the imbalance signal is substantially sinusoidal, with one revolution of shaft 12 corresponding to one signal period of the imbalance signal.

The imbalance signal is fed to imbalance analysis unit 62, in which digital imbalance values u can be generated from the analog imbalance signal. To this end, imbalance analysis unit 62 may include a low-pass filter for limiting the bandwidth of the imbalance signal and for filtering out high-frequency signal components that are superimposed on the pure imbalance signal, as well as an analog-to-digital converter for digitizing the analog signal. Preferably, a sigma-delta converter is used here.

Suitable signal lines 64 are provided for transmitting control signals to imbalance detection unit 60, in particular an imbalance request command U_RQ to initiate the generation of imbalance values and to transmit imbalance values u to signal-processing unit 70.

The generation of imbalance values may be performed in a time-controlled or position controlled manner.

In signal-processing unit 70, angle values φ and imbalance values u are further processed into imbalance information I which permits balancing of the device on which the angle-measuring device is used. In the context of this invention, imbalance information I includes at least information about the phase relation of the imbalance signal with respect to the angular position of shaft 30 to be measured, as well as the amplitude of the imbalance signal. Since the amplitude of the imbalance signal is dependent on the rotational speed of the shaft, imbalance information I may also include the rotational speed of the shaft. This applies especially if no defined rotational speed is selected for the determination of the imbalance information.

In order for the processes in the angle-measuring device to be synchronized and performed in a precise time pattern, a clock generator 72 is provided in the angle-measuring device to generate a clock signal CLK serving as a time base. Accordingly, clock signal CLK may be fed to position-sensing unit 50, imbalance detection unit 60, signal-processing unit 70, and interface unit 80.

Interface unit 80 enables communication with subsequent electronics 100. In particular, interface unit 80 receives commands and possibly data from subsequent electronics 100 and transmits output data to subsequent electronics 100. In addition to imbalance information I, the output data also includes, for example, angle values φ requested by subsequent electronics 100 by means of a position request command. Preferably, interface unit 80 is suitable for serial data transmission. Depending on the physical transmission principle selected, data transmission may take place via conventional electrical leads, optical fibers or wirelessly.

The physical connection between interface unit 80 and a corresponding interface unit of subsequent electronics 100 is provided via a data channel 82. Data channel 82 includes all components necessary to facilitate data exchange between interface unit 80 of the angle-measuring device and the interface unit of subsequent electronics 100. Examples of such components include signal converter components, data receivers/transmitters, leads (electrical, fiber-optic, etc.), connectors, etc.

Figure 3:
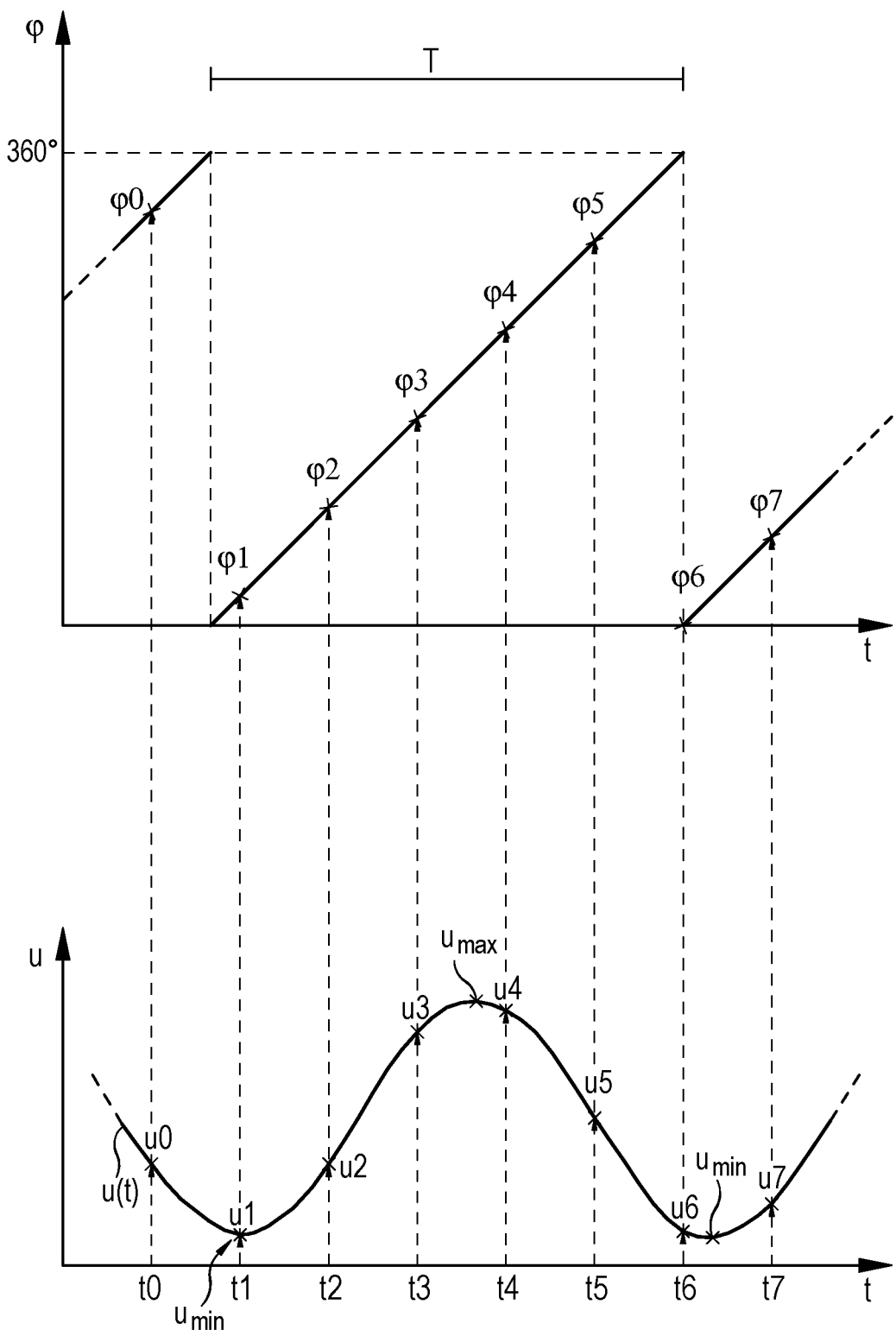
FIG. 3 is a signal diagram illustrating time-controlled generation of imbalance values.

FIG. 3 shows a signal diagram illustrating time-controlled generation of imbalance values. The upper portion shows the variation of the rotation angle of shafts 12, 30 at a constant rotational speed. During a period T corresponding to the time required by shaft 30 for one revolution, angle value φ, starting from a reference position associated with angle value 0°, increases linearly from 0° to 360°, and then jumps back to 0°. The illustrated jump results from the chosen form of representation and is not a jump in a mathematical sense. In reality, angle values φ follow a continuous function.

The lower portion of FIG. 3 shows the variation of the imbalance signal acquired by the imbalance sensor 20. At a constant rotational speed, imbalance signal u(t) is substantially sinusoidal and also has a period T corresponding to the time for one revolution of shaft 30. The chosen illustration is merely for purposes of improved understanding and shows an idealized curve of imbalance signal u(t). In practice, imbalance signal u(t) usually has superimposed thereon noise which results from vibrations or accelerations having other causes than the imbalance of shaft 30.

Signal-processing unit 70 initiates the generation of imbalance values u at regular intervals and also of angle values φ, unless the angle values are generated continuously. Imbalance values u and angle values φ are stored for further processing. The intervals are determined by a sampling rate (sampling frequency) which, according to the Nyquist-Shannon sampling theorem, must exceed twice the highest frequency to be sensed of the signal to be sampled in order to be able to reconstruct the original signal from the discrete values during further signal processing. In the present case, imbalance signal u(t) has the rotational frequency of shaft 30. Provided that the bandwidth of imbalance signal u(t) is limited to the maximum expected rotational frequency of shaft 30, for example by using a low-pass filter, this means that the sampling rate must exceed twice the rotational frequency of shaft 30 in order to be able to reconstruct imbalance signal u(t) from discrete values u. In practice, however, a significantly higher sampling rate is usually selected instead of the lowest theoretically possible sampling rate in order to have a sufficient number of values for further signal processing when the shaft 30 to be measured rotates at the highest speed to be sensed, and in particular, to be able to achieve a high degree of noise and interference suppression. In this connection, it is advantageous, although not absolutely necessary, to acquire imbalance values u and angle values φ simultaneously and store them for further processing.

In the example of FIG. 3, imbalance values u0 through u7 and angle values φ0 through φ7 are generated or acquired at points in time t0 through t7. More generally, this means that imbalance values ui and angle values φi are acquired at respective points in time ti. Thus, signal-processing unit 70 is provided with value pairs that can be used as a basis for determining imbalance information I. In particular, it is possible to determine the phase relation of imbalance signal u(t) with respect to a reference point of the angle measurement, and thus to determine the angle values at which imbalance signal u(t) has a maximum umax and/or a minimum umin, as well as the amplitude of imbalance signal u(t). Imbalance information I, in turn, can be transmitted via interface unit 80 and data channel 82 to subsequent electronics 100, where it may be used, for example, to balance rotary table 32.

In order to prevent too many imbalance values ui from being generated for each revolution of shaft 12 when it rotates at low speeds, it may be provided to adapt the sampling rate as a function of the rotational speed.

Figure 4:
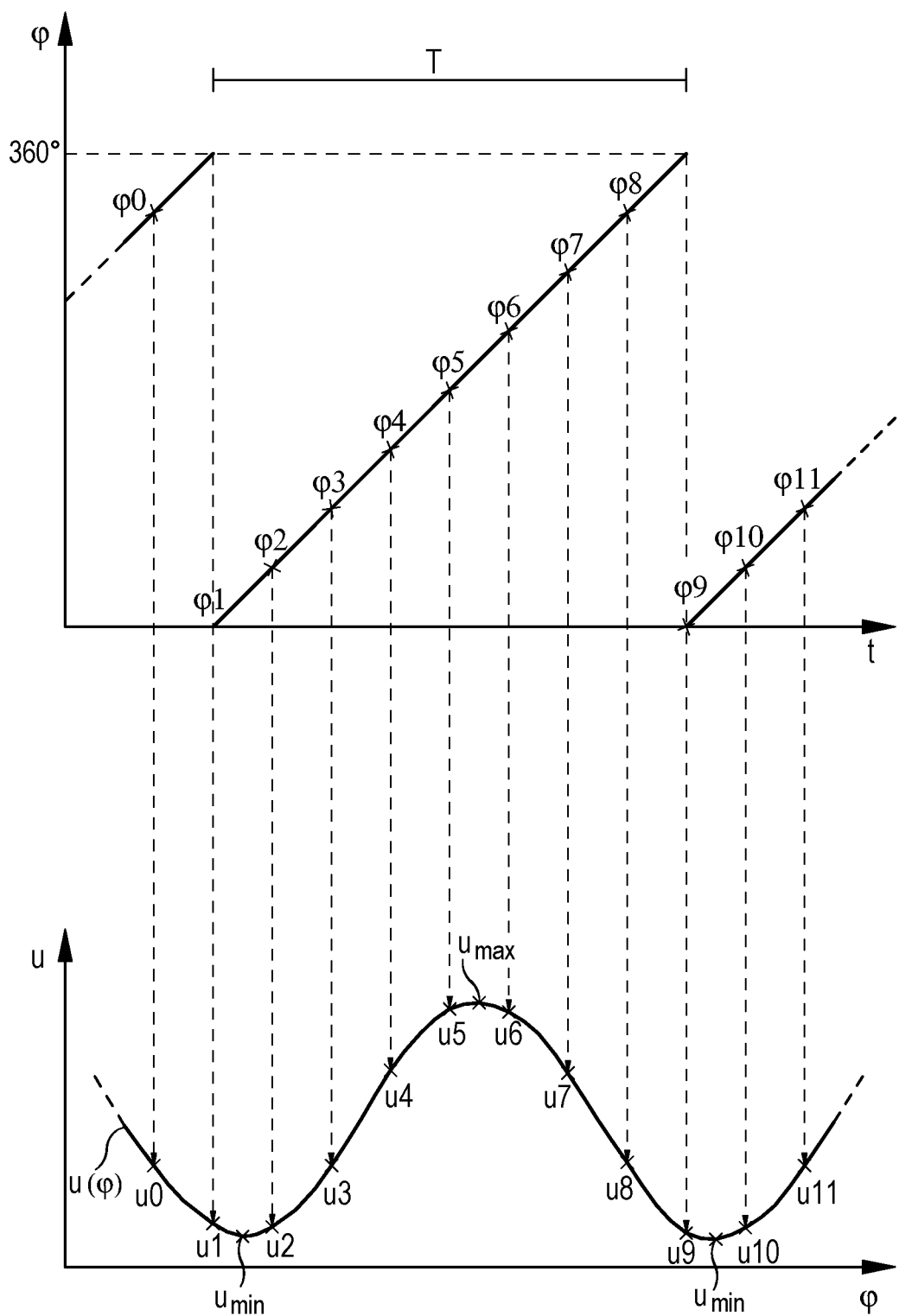
FIG. 4 is a signal diagram illustrating position-controlled generation of imbalance values.

FIG. 4 shows a signal diagram illustrating position-controlled generation of imbalance values u. Again, the upper portion shows the variation of the rotation angle of shafts 12, 30 at a constant rotational speed, while the lower portion shows the variation of the imbalance signal acquired by imbalance sensor 20 as a function of angle value φ.

Signal-processing unit 70 initiates the generation of imbalance values at defined angular positions of shaft 30. In the example shown, imbalance values u0 through u11 are generated at angle values φ0 through φ11 (more generally, imbalance values ui are generated at angle values φi), the angular distance between two successive angle values being 45°. To be able to determine as accurately as possible the angle values φi at which imbalance values ui are to be generated, various advantageous procedures may be used:

Position-sensing unit 50 generates instantaneous angle values φ at short intervals, either automatically or upon request from signal-processing unit 70, and outputs the same to signal-processing unit 70. Based on two or more successive angle values φ, signal-processing unit 70 determines, for example by extrapolation, the points in time at which an angle value φi is reached at which an imbalance value ui is to be generated, and initiates the generation of imbalance value ui at these points in time.

Position-sensing unit 50 continuously generates instantaneous angle values φ and outputs the respective instantaneous angle value φ to signal-processing unit 70. Signal-processing unit 70 initiates the generation of imbalance values ui at defined bit changes of angle values φ. Advantageously, bit changes (i.e., changes in bit value from 1 to 0 or from 0 to 1) of individual bits of angle values φ should be selected here because this automatically results in an even distribution of imbalance values ui over one revolution of shaft 12.

If count signals are transmitted as part of angle values φ, these count signals may be used (for example by processing of signal edges) to initiate the generation of imbalance values ui. In order to reduce the number of imbalance values ui, the count signals may be counted by a counter, and an imbalance value ui may be generated only at each $n^{th}$ bit change. Here too, it is advantageous to use only a single bit of the counter output.

In this method, imbalance values ui are not time-dependent but dependent on the rotation angle. For this reason, the imbalance signal can also be represented as a function of rotation angle φ of shaft 12 and exhibits exactly one signal period for each revolution of shaft 12.

Position-controlled generation of imbalance values is particularly advantageous because the same number of imbalance values is generated during each revolution of shaft 30, regardless of the rotational speed or acceleration. Due to the fixed association between an angle value and an imbalance value, the phase information of imbalance information I can already be derived from the imbalance values.

Regardless of whether the imbalance values are generated in a time-controlled or position-controlled manner, signal-processing unit 70 is provided with sequences of angle and imbalance values for generating imbalance information I using digital signal processing techniques.

Figure 5:
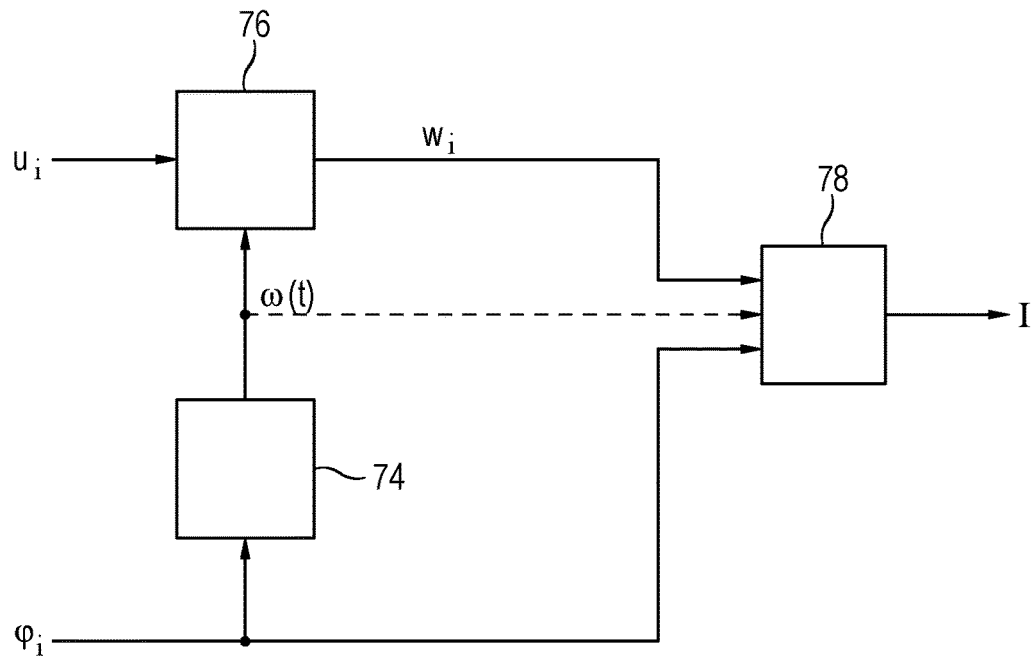
FIG. 5 is a block diagram of a first embodiment of a signal-processing unit for generating imbalance information.

FIG. 5 shows a block diagram of a signal-processing unit 70 for generating imbalance information I from sequences of angle values φi and imbalance values ui which are fed thereto from position-sensing unit 50 and imbalance detection unit 60 in a time-controlled manner. Signal-processing unit 70 includes a rotational-speed-determining unit 74, a filter unit 76, and an analysis unit 78.

Rotational-speed-determining unit 74 receives angle values φi and determines the rotational frequency ω(t) of shaft 12 from angle values φi. Rotational frequency ω(t) is fed to filter unit 76, which is configured as an adaptive low-pass filter whose pass frequency can be set to rotational frequency ω(t) of shaft 12.

Regardless of whether the at least one imbalance sensor 20 is an acceleration sensor, a displacement sensor, or an alternative sensor suitable for measuring imbalance, imbalance signal u(t) always has superimposed thereon noise signals having other causes than the imbalance of shaft 12. Therefore, filter unit 76, set to rotational frequency ω(t) of shaft 12, filters the received imbalance values ui representing the imbalance signal u(t) and generates a sequence of filtered imbalance values wi which, in turn, represent a filtered imbalance signal w(t).

As an alternative to a bandpass, filter unit 76 may also be suitably configured to mathematically determine the filtered imbalance values wi or filtered imbalance signal w(t) using, for example, a Fourier transform, a fast Fourier transform (FFT), or other signal-processing techniques having the function of a narrow-band bandpass filter.

Filtered imbalance values wi and angle values φi are fed to analysis unit 78, which generates imbalance information I therefrom. To this end, analysis unit 78 determines, from filter imbalance values wi, the amplitude of filtered imbalance signal w(t) as well as its phase relation with respect to the angular position of shaft 12, represented by angle values φi.

In addition, analysis unit 78 may also receive rotational frequency ω(t), which may supplement imbalance information I, so that the speed dependence of the amplitude of imbalance signal u(t) may also be accounted for in the balancing of shaft 30 of rotary table 32 or, more generally, of the machine to be balanced.

On the other hand, in a very simple case, rotational-speed-determining unit 74 may be completely omitted if imbalance information I is always determined at the same rotational speed. This rotational speed may be selected, for example, by subsequent electronics 100. In this case, moreover, filter unit 76 does not need to be adaptive, but may be permanently set to the predetermined rotational speed.

Since all components necessary to determine imbalance information I are disposed in the angle-measuring device, correction values to be accounted for in determining imbalance information I during the operation of the angle-measuring device may be determined and stored already at the manufacturer's site, for example during a calibration procedure. The correction values may be related to signal processing, in particular to signal propagation delays, such as the time required to process the output signals of imbalance sensor 20 into imbalance values, or the signal propagation delay in filter unit 76. In addition, the correction values may account for geometric conditions, such as the angular position of the at least one imbalance sensor 20 with respect to a reference point of the position measurement.

Figure 6:
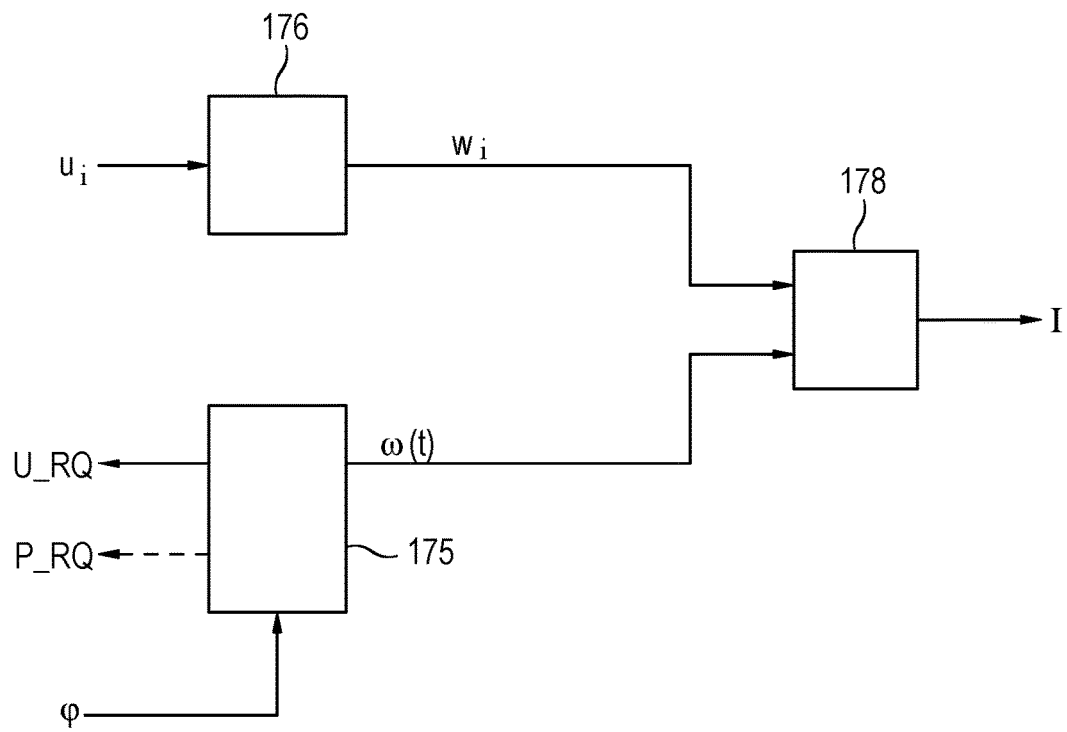
FIG. 6 is a block diagram of a further embodiment of a signal-processing unit for generating imbalance information.

FIG. 6 shows a block diagram of a signal-processing unit 70 for generating imbalance information I from sequences of imbalance values ui fed thereto from imbalance detection unit 60 in a position-controlled manner. Signal-processing unit 70 includes a request unit 175, a filter unit 176, and an analysis unit 178.

Angle values φ are fed to request unit 175. To this end, position-sensing unit 50 produces angle values φ, either continuously or, as indicated by the dashed arrow, in response to position request commands P_RQ sent by request unit 175 to position-sensing unit 50 at equally spaced time intervals. Uniform time intervals are also advantageous in the latter case.

Using, for example, one of the advantageous methods described above in connection with FIG. 4, request unit 175 determines from the received angle values φ the points in time at which imbalance values ui are to be measured and sends imbalance request commands U_RQ to imbalance detection unit 60 at these points in time to initiate the measurement.

This method has two important advantages over the aforedescribed exemplary embodiment:

Due to the fixed association between imbalance values ui and angle values φi, the phase information of imbalance information I is already contained in imbalance values ui.

Since imbalance values ui are not determined in a time-dependent manner, but in a position-dependent manner, they are also independent of the rotational frequency ω(t), and possibly even of an acceleration of shaft 12. For each revolution of shaft 12, a set of imbalance values ui is obtained which corresponds to exactly one period of imbalance signal u(t), Imbalance values ui are in turn fed to filter unit 176, which filters out noise signals and outputs filtered imbalance values wi to analysis unit 178. Due to the above reasons, filter unit 176 does not need to be adaptive, and thus does not need any information about the rotational frequency ω(t).

Analysis unit 178, in turn, determines imbalance information I; i.e., the amplitude of the imbalance signal w(t) represented by filtered imbalance values wi, as well as its phase relation with respect to a reference point of the angle measurement.

To be able to account for the speed dependence of the amplitude of imbalance signal, request unit 175 may output the rotational frequency ω(t) of shaft 12 to analysis unit 178 to supplement imbalance information I.

Although the exemplary embodiments described herein only illustrate the processing of imbalance values ui of just one imbalance sensor 20, one skilled in the art could readily enhance in particular signal-processing unit 70 such that it is capable of processing imbalance values ui of a plurality of imbalance sensors 20.

Of course, the present invention is not limited to the exemplary embodiments described herein. Rather, one skilled in the art will be able to devise additional variants based on the exemplary embodiments disclosed herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An angle-measuring device comprising:
   a housing;
   a shaft rotatably supported in the housing by a bearing, the shaft being mechanically rigidly coupleable by a connector to a shaft of a machine, a portion of the bearing that is stationary with respect to the shaft being mechanically flexibly connected to the housing via a coupling;
   a position sensor configured to generate angle values indicating an angular position of the shaft with respect to a reference position;
   an interface configured to communicate with subsequent electronics via a data channel;
   at least one imbalance sensor configured to generate an imbalance signal from imbalance-induced excursions of the shaft;
   an imbalance analyzer configured to generate imbalance values from the imbalance signal; and
   a signal processor configured to generate imbalance information from the angle values and the imbalance values, the imbalance information being transmittable through the interface to the subsequent electronics.

2. The angle-measuring device as recited in claim 1, wherein the coupling includes at least one of a spring and a damping element.

3. The angle-measuring device as recited in claim 1, wherein the coupling is rigid in a torsional direction.

4. The angle-measuring device as recited in claim 1, wherein the at least one imbalance sensor is mechanically rigidly connected to the stationary portion of the bearing.

5. The angle-measuring device as recited in claim 4, wherein the at least one imbalance sensor is disposed on a circuit board attached to the stationary portion of the bearing.

6. The angle-measuring device as recited in claim 1, wherein the at least one imbalance sensor includes two imbalance sensors whose measurement directions extend in an orthogonal relationship to one another in a plane of rotation of the shaft.

7. The angle-measuring device as recited in claim 1, further comprising an additional imbalance sensor whose measurement direction is parallel to an axis of rotation of the shaft.

8. The angle-measuring device as recited in claim 1, wherein the at least one imbalance sensor is an acceleration sensor or a displacement sensor.

9. A method for operating an angle-measuring device, the method comprising:
   generating, by a position sensor of the angle-measuring device, angle values indicating an angular position of a shaft with respect to a reference position,
   generating, by an imbalance analyzer of the angle-measuring device, imbalance values from an imbalance signal produced by at least one imbalance sensor of the angle-measuring device, the imbalance values being a measure of the imbalance-induced excursion of the shaft,
   feeding the angle values and the imbalance values to a signal processor of the angle-measuring device,
   generating, by the signal processor based on the angle values and the imbalance values, the imbalance information which includes at least a phase relation of the imbalance signal with respect to the reference position and an amplitude of the imbalance signal,
   wherein the shaft is rotatably supported in a housing of the angle-measuring device by a bearing and is mechanically rigidly coupled by a connector to a shaft of a machine, and
   wherein a portion of the bearing is stationary with respect to the shaft and is mechanically flexibly connected to the housing via a coupling.

10. The method as recited in claim 9, wherein:
the signal processor includes a filter to which the imbalance values are fed and the filter filters out noise superimposed on the imbalance values and generates filtered imbalance values, and
the filtered imbalance values are fed to an analyzer which generates the imbalance information.

11. The method as recited in claim 10, wherein:
the imbalance values are generated in a time-controlled manner,
the signal processor includes a rotational-speed determiner to which the angle values are fed and the rotational-speed determiner determines the rotational frequency of the shaft from the angle values,
the rotational frequency is fed to the filter, which is configured as an adaptive bandpass filter, and a pass frequency of the filter is set to the rotational frequency, and
the angle values are fed to the analyzer.

12. The method as recited in claim 11, wherein the rotational frequency of the shaft is fed to the analyzer.

13. The method as recited in claim 10, wherein the imbalance values are generated in a position-controlled manner, wherein the signal processor includes a requester to which the angle values are fed, and wherein the requester determines, from at least two successive angle values, points in time at which to generate the imbalance values, and initiates the generation of the imbalance values at the determined points in time.

14. The method as recited in claim 13, wherein the requester determines, from the at least two successive angle values, the rotational frequency, and determines the points in time at which to generate the imbalance values by extrapolation.

15. The method as recited in claim 14, wherein the rotational frequency of the shaft is fed to the analyzer.

16. The method as recited in claim 9, wherein the imbalance information is determined at a constant rotational frequency of the shaft.

17. The method as recited in claim 9, wherein the coupling includes at least one of a spring and a damping element.

18. The method as recited in claim 9, wherein the coupling is rigid in a torsional direction.

19. The method as recited in claim 9, further comprising transmitting, by an interface of the angle-measuring device, the imbalance information to subsequent electronics via a data channel.

* * * * *